United States Patent [19]
Siligoni et al.

[11] Patent Number: 5,315,653
[45] Date of Patent: May 24, 1994

[54] CURRENT LIMITED SUBSCRIBER INTERFACE CIRCUIT

[75] Inventors: Marco Siligoni, Vittuone; Vanni Saviotti, Monza, both of Italy; Maria L. Marcioni, legal representative of said Marco Siligoni, deceased

[73] Assignee: SGS-Thomson Microelectronics s.r.l., Milan, Italy

[21] Appl. No.: 880,213

[22] Filed: May 5, 1992

[30] Foreign Application Priority Data

Jun. 25, 1991 [IT] Italy .................. MI91A001747

[51] Int. Cl.⁵ .................................... H04M 19/00
[52] U.S. Cl. ........................ 379/413; 379/324; 379/399; 379/401
[58] Field of Search ............... 379/413, 324, 399, 400, 379/401, 405, 395, 345, 344

[56] References Cited

U.S. PATENT DOCUMENTS 4,485,341  11/1984  Welty et al. ............... 379/405 X
4,841,565   6/1989  Siligoni et al. ............. 379/413

Primary Examiner—James L. Dwyer
Assistant Examiner—Paul Fournier

[57] ABSTRACT

An electronic interface circuit between a telephone subscriber line and a telephone main exchange is disclosed which forms, with the main exchange battery, a supply bridge for the telephone line, with limitation of the line current to a predetermined threshold value. The voltage/current characteristic of the supply bridge is balanced for lower values of the line current than the threshold current and is unbalanced whenever the line current attains said threshold current.

17 Claims, 2 Drawing Sheets

CURRENT LIMITED SUBSCRIBER INTERFACE CIRCUIT

This invention relates to telephone circuits, and in particular, to a current-limited electronic interface circuit between a telephone subscriber line and main exchange controls.

A telephone subscriber line is connected to a telephone main exchange by means of a double-wire line whose terminals can be connected, upon command from the main exchange controls, to a direct voltage source or exchange battery which supplies the line for operating the apparatus.

The coupling between the line and the exchange is provided by the so-called subscriber link which, in conventional telephone exchanges, is essentially comprised of electromechanical components.

The equivalent DC circuit of an electromechanical subscriber link connected to the exchange battery is shown in FIG. 1 of the accompanying drawings.

Indicated at LN is a telephone line which is connected, on the one side, to a telephone set U, and with its two terminals A and B to a main exchange battery UB through a subscriber link AU consisting of two identical relays, represented by an inductor L and a resistor RP in series. The battery UB, which has a predetermined voltage value in the 40 to 60 V range to suit different specifications from the telephone service company, has its positive terminal connected to ground at the exchange.

With modern telephone exchanges, the subscriber link is formed of an electronic circuit, often made up of monolithic integrated circuit devices called SLIC (Subscriber Line Interface Circuit). It interfaces the subscriber line with the main exchange controls and performs a number of functions, including handling of the DC voltage supply and sending ring signals, providing conversion from two to four wires, protection against overloads, performing operability checks, etc.

Such an electronic subscriber link should provide basic electric and performance characteristics which are comparable with those of the electromechanical subscriber link, if it is to ensure proper coupling to the main exchange even of subscriber sets designed for matching to electromechanical subscriber links. In particular, an electronic subscriber interface, or link, should have an internal resistance equal to the sum of the resistances RP of the relay windings of conventional subscriber links. These resistances, referred to as bridge resistances, have a predetermined value within the range of 200 to 500 Ohms, depending on the specifications from different telephone companies.

Conventional electronic subscriber interface circuits fall into two categories: balanced and unbalanced ones. Balanced circuits have an equivalent DC circuit which is substantially similar to that of the conventional electromechanical subscriber link as regards internal resistance, that is they are provided with two identical bridge resistances RP, each in series with a wire in the line. Unbalanced circuits have, as their internal resistance, a resistance which is twice the bridge resistance RP, in series with just one of the line wires, usually the one which is applied the negative potential of the main exchange battery. In this case, the circuit arrangement may be such as to enable an external transistor to be driven which provides the line voltage drop, thus drawing power from the interface circuit that must be dissipated. In the former instance, the advantage is secured of full compatibility with all the subscriber sets designed for use with electromechanical subscriber links, but at the expense of some circuit complexity and the need for a suitably sized dissipator, since all the power must be dissipated by the interface circuit. In the latter instance, on the other hand, the compatibility with existing sets is restricted, but the circuitry can be made simpler and dissipation more efficient.

It is the object of this invention to provide a current-limited electronic subscriber interface circuit which combines the advantages of both categories of interface circuits and has none of their drawbacks.

This object is achieved according to the invention by an electronic interface circuit as defined and characterized in the appended claims to this specification.

The invention will be more clearly understood from the following detailed description of an embodiment thereof, given by way of example and not of limitation with reference to the accompanying drawings, wherein.

Figure 1:
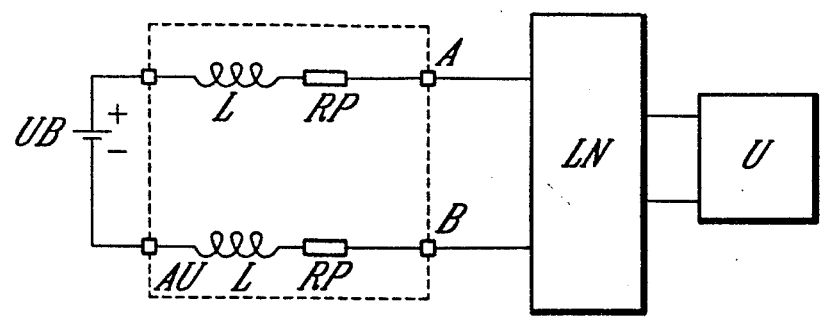
FIG. 1 shows the equivalent DC circuit of a conventional subscriber link of the electromechanical type.
Figure 2:
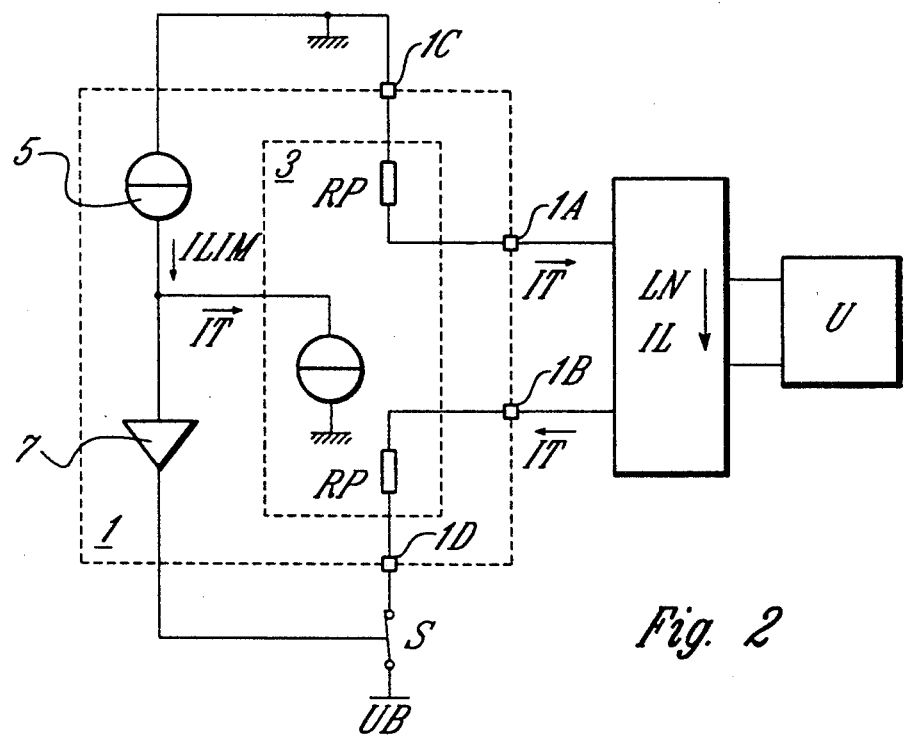
FIG. 2 is a general block diagram depicting a subscriber interface circuit according to the invention.

In FIG. 2, an electronic subscriber interface circuit according to the invention, generally shown at 1, has two output terminals 1A and 1B connected to a subscriber line LN which communicates a subscriber set U to a main telephone exchange, not shown, and two supply terminals of which one, designated 1C, is connected to the positive pole of a telephone exchange battery connected to the exchange ground, and the other, designated 1D, is connected to the negative pole of that same battery through a normally closed electronic switch S.

The circuit 1 has, between the output terminal 1A and the supply terminal 1C, as well as between the output terminal 1B and the supply terminal 1D, an equivalent resistance RP of the same value as the value specified for the bridge resistances of the telephone exchange subscriber links, e.g. 400 Ohms. It includes circuit means, illustrated by a block 3 connected to the output terminals 1A and 1B, which are effective to detect the current IL flowing through the line LN and extract the useful component therefrom, that is the transverse current IT, a current source 5 generating a current ILIM of predetermined value, and a current comparator 7 which is connected to the circuit means 3 and the current source 5 to compare the transverse line current IT and the threshold current ILIM with each other and supply on its output, which is connected to the control terminal of the electronic switch S, a signal effective to open the switch upon the current IT reaching the threshold current level ILIM.

Figure 3:
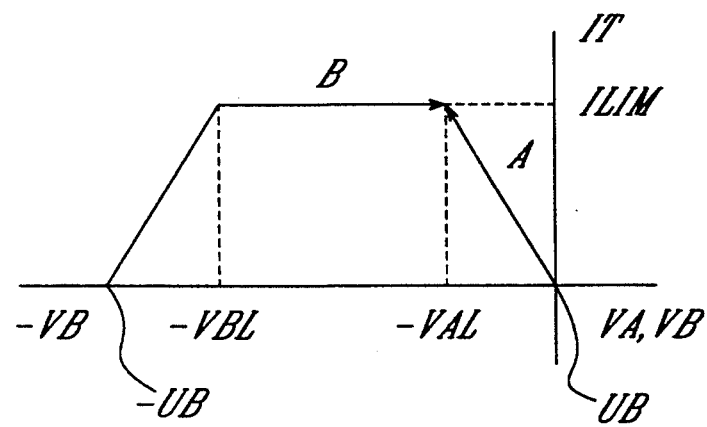
FIG. 3 shows the voltage vs. current characteristic of the circuit in FIG. 2.

The operation of the inventive circuit will be now described with reference to FIG. 3. With no load on the line, i.e. with IT=0, across the terminals 1A and 1B the battery voltage UB appears. A load on the line, that is a current IT greater than 0, brings about an equal voltage drop IL×RP across each of the bridge resistances RP, thereby the terminal 1A takes a more negative potential and the terminal 1B takes a less negative potential with respect to the no-load condition. If the load on the line increases to the point that the transverse current IT, derived from the current IL, becomes equal to the limiting current ILIM, the comparator 7 controls the switch S to open, thereby the transverse current will be limited to the value ILIM even if the load is further increased. In this situation, the potential at the terminal 1A is kept at the value of −VAL which it had when IT=ILIM, whereas the potential at the terminal 1B varies between the value −VBL which it had when IT=ILIM and the value of −VAL, depending on the magnitude of the load.

Thus a voltage vs. current characteristic is obtained of the supply bridge comprising the interface circuit 1 coupled to the exchange battery UB which may be defined "mixed" with current limitation, that is balanced before the limitation and unbalanced within the limitation. It will be appreciated that, thanks to this characteristic, subscriber sets can be used without problems which require a change of potential across both line terminals for proper operation. On the other hand, the interface circuit 1 can be constructed with a reduced number of components with respect to a similar circuit having a fully balanced characteristic. In particular, it only requires a single electronic switch for current limitation, just as in the case of a circuit with a fully unbalanced characteristic, and has the same low power dissipation as the latter.

Figure 4:
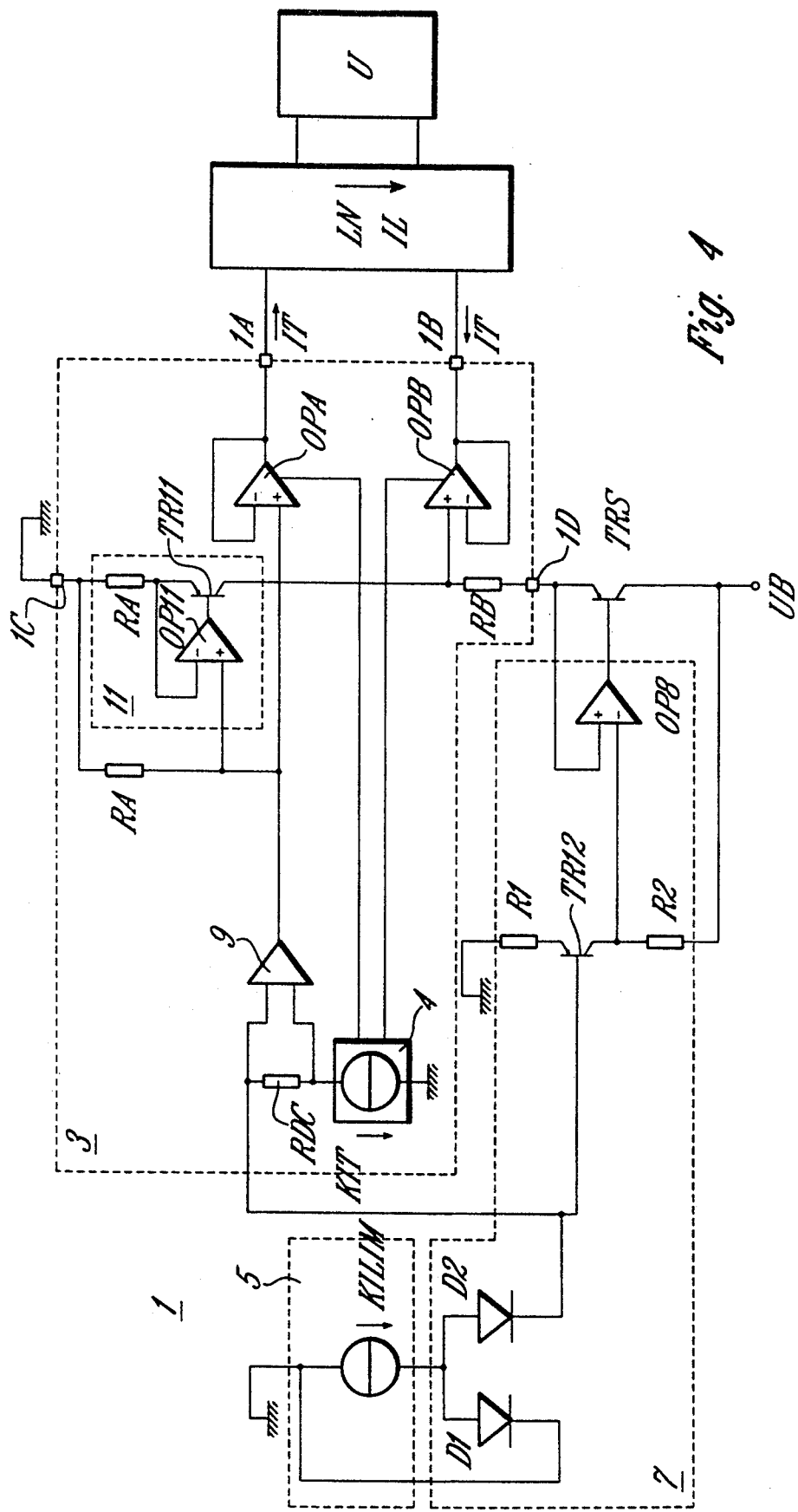
FIG. 4 shows in diagramatic form a subscriber interface circuit according to the invention.

A preferred embodiment of the interface circuit 1 according to the invention is shown diagramatically in FIG. 4 limited to those circuit components which jointly perform the functions of supply bridge and current limiter.

The circuit 1 comprises, as its output stage, two operational amplifiers OPA and OPB which are buffer-connected, that is have their respective inverting terminals joined to their respective outputs, connected together and to the line into the so-called bridge configuration, i.e. with their respective outputs, which are the output terminals of circuit 1A and 1B, joined to the line LN. The non-inverting input terminals of the operational amplifiers OPA and OPB are connected, each through the resistor RA and RB, respectively, to the supply terminals. Resistor RA is connected directly to the positive pole of the exchange battery which is, in turn, connected to the exchange ground, and resistor RB is connected to the negative pole UB of the exchange battery through a transistor TRS of the pnp type acting as an electronic switch.

Coupled to the operational amplifiers OPA and OPB is a circuit block 3 effective to pick up information therefrom about the current flowing through the line LN and extract from it the transverse component IT. A detailed description of a subscriber interface circuit which incorporates circuit means serving this function is given in Patent Application No. 19983-A/85 filed on Mar. 20 1985 by SGS-MICROELETTRONICA SPA. Shown at block 4 is a current source which generates a current kIT proportional to the transverse current IT and is connected between the exchange ground and the junction point of a first terminal of a voltage/current converter 9 to a terminal Df a resistor RDC, the other terminal whereof is connected to the second terminal of the converter 9. The latter has its output connected to the non-inverting input of operational amplifier OPA and the input of a phase inverter circuit consisting of an operational amplifier OP11 and a transistor TR11 of the pnp type. The operational amplifier OP11 has its non-inverting input arranged to form the phase inverter circuit input, its inverting input connected to the emitter of the transistor TR11, and its output connected to the base of the transistor TR11. The emitter of TR11 is connected to ground through a resistor which has the same resistance as resistor RA, and the collector of TR11 is connected to the non-inverting input of the operational amplifier OPB.

In addition, this circuit 1 includes a threshold current source 5 having one terminal connected to the exchange ground, and current comparator means, generally designated 7, comprising two diodes D1 and D2 with their anodes jointly connected to the other terminal of the current source 5. The cathode of diode D1 is connected to ground and the cathode of diode D2 is connected to the second terminal of the voltage/current converter 9 and to the base of a transistor TR12 of the pnp type whose emitter is grounded through a resistor R1 and whose collector is connected to the battery UB, via a resistor R2, and to the non-inverting terminal of an operational amplifier OP8. The latter has its output connected to the base of transistor TRS and its inverting input connected to the emitter of that same transistor TRS.

We will now consider the operation of this circuit 1 in FIG. 4. The load on the line LN is assumed to be such that the voltage across the terminals 1A and 1B causes a current to flow through the line which originates, within the source 4, a current kIT proportional to the transverse line current IT, with k less than 1, which is below the predetermined value kILIM of the threshold current generated by the source 5. Thus, across the two inputs of the voltage/current converter 9 there appears a voltage Vi=kIT×RDC, and a current flows through the converter 9 output which causes across the resistor RA a voltage drop nVI, where n is an integer or 1. This voltage is input to the amplifier OPA, and following phase inversion by the inverter 11, to the amplifier OPB. The potentials vA and VB on the output terminals 1A and 1B, therefore, follow the variations of currents IA and IB flowing through the line wires in a symmetrical fashion relatively to the voltage UB/2. As for the current comparator 7, so long as the current kIT is below the threshold current KILIM, the diodes D1 and D2 will be conducting, thereby on the base of transistor TR12 there appears substantially the ground potential, and on the comparator output, i.e. on the base of transistor TRS, there appears a negative potential close to battery voltage.

Where the load on the line LN is such that the current kIT equals the threshold current kILIM, the diode D1 is shut down and the input of comparator 7 goes negative so that on its output, that is on the base of transistor TRS, there appears a positive voltage, that is one approximating the exchange ground level, which shuts down transistor TRS. Under this condition, the potential on the output terminal 1A will stay fixed at the value it had upon kIT=kILIM because the voltage drop across resistor RDC stays constant, whereas that on the output terminal 1B can be further varied to go more positive, due to the supply terminal 1D, which is normally at a potential approximating that of the battery negative pole, being enabled to become less negative on account of transistor TRS being open.

While a single embodiment of the invention has been illustrated and described, it stands to reason that several variations and modifications would be possible based on the same inventive concept.

We claim:

1. An electronic interface circuit between a telephone subscriber line and a main exchange connectable to a main exchange battery to provide a supply bridge for the telephone line, having the line current limited to a predetermined threshold value, characterized in that the voltage/current characteristic of the supply bridge is balanced for lower line current values than the threshold current and is unbalanced upon the line current attaining the level of said threshold current.

2. An electronic interface circuit between a telephone subscriber line and a main exchange, comprising:
    first and second supply terminals adapted to be connected to the poles of a main exchange battery;
    first and second output terminals adapted to be connected to the wires of a telephone subscriber line;
    circuit means effective to provide, between the first supply terminal and the first output terminal, a first equivalent resistance, and between the second supply terminal and the second output terminal, a second equivalent resistance, said equivalent resistances having substantially the same predetermined values;
    detector means effective to detect the current flowing through the telephone line and extract a transverse component therefrom;
    means for generating a threshold current having a predetermined value;
    comparator means effective to compare the transverse component of the detected line current to the threshold current, and to produce a threshold signal where the two compared currents are equal to each other; and
    limiter means effective to limit the line current to the value of the threshold current;
    characterized in that
    the first equivalent resistance is connected directly to one of the exchange battery poles with the battery connected between the first and the second supply terminals; and
    the limiter means comprise a normally closed electronic switch connected serially to the second equivalent resistance and having a control terminal connected to the output of the comparator means, thereby said electronic switch is open whenever said threshold signal appears on its control terminal.

3. An electronic circuit according to claim 2, characterized in that said circuit means comprise:
    a pair of operational amplifiers adapted for connection in the bridge configuration to the subscriber line and whose outputs are connected to the first and the second output terminals, respectively;
    a voltage/current converter whose output is connected directly to the input of one of the two operational amplifiers in the pair, and through an inverter, to the input of the other of the two operational amplifiers;
    a resistor, having a predetermined resistive value and being connected between two input terminals of the voltage/current converter;
    a current source coupled to said detector means of the line current to generate a proportional current to the transverse component of the line current, and connected to one of the resistor terminals, said predetermined resistive value and the other components of the circuit being selected to provide said identical equivalent resistances;
    characterized in that the current comparator means comprise:
    first and second diodes connected with one of their homolog terminals to the means for generating a threshold current, the other terminal of the first diode being connected to the first supply terminal and the other terminal of the second diode being connected to the other of the resistor terminals; and
    transducer means having an input connected to said other terminal of the second diode and an output forming the output of the comparator means; and that
    the electronic switch comprises a transistor the emitter-collector section whereof is in series with the second supply terminal and the base whereof constitutes said control terminal, said transistor being biased to be in conduction whenever the proportional current to the transverse component of the line current is below the threshold current.

4. An electronic interface circuit connectable between a telephone subscriber line and a main exchange and having a threshold current with a predetermined value, the circuit comprising:
    first and second supply terminals adapted to be connected to poles of a main exchange battery:
    first and second output terminals adapted to be connected to wires of the telephone subscriber line:
    a first resistance circuit coupled between said first supply terminal and said first output terminal and having a first resistance value;
    a second resistance circuit having a substantially equal resistance value to said first resistance value and connectable between said second supply terminal and said second output terminal;
    a detector coupled to the subscriber lines and detecting a current flowing therethrough, said detector extracting a transverse component of said current from the subscriber lines; and
    a current limiter for limiting current, said current limiter using said first resistance and said second resistance when the value of said transverse component is less than the predetermined value of the threshold current, said current limiter using only said first resistance when the value of said transverse component is equal to the predetermined value of the threshold current causing the circuit to operate in a balanced configuration when the value of said transverse component is less than the predetermined value of the threshold current and in an unbalanced configuration when the value of said transverse component is equal to the predetermined value of the threshold current.

5. The circuit of claim 4, further including a comparator comparing said transverse component with the threshold current and generating a threshold signal when the value of said transverse component is equal to the predetermined value of the threshold current.

6. The circuit of claim 4, further including a switch having a control terminal adapted to receive a threshold signal when the value of said transverse component is equal to the predetermined value of the threshold current.

7. The circuit of claim 6 wherein said switch is a normally closed switch that couples said second resistance between said second supply terminal and said second output terminal, said switch opening when said threshold signal is present at said control terminal.

8. The circuit of claim 6 wherein said switch is an electronic switch.

9. The circuit of claim 4 wherein said current limiter comprises first and second operational amplifiers adapted for connection to the telephone subscriber line with the outputs of said first and second operational amplifiers coupled to said first and second output terminals, respectively.

10. The circuit of claim 9, further including a voltage/current converter having first and second inputs terminals and an output coupled directly to an input of one said first and second operational amplifiers and, through an inverter, to an input of the other of said first and second operational amplifiers.

11. The circuit of claim 10, further including a resistor having a predetermined resistive value and being connected between said first and second input terminals of said voltage/current converter.

12. The circuit of claim 11, further including a current source coupled to said detector and to one end of said resistor and generating a proportional current to said transverse current, said predetermined resistive value and other circuit components of the circuit being selected to provide said substantially equal resistance values.

13. The circuit of claim 12, further including a comparator comparing said transverse component with the threshold current and generating a threshold signal when the value of said transverse component is equal to the predetermined value of the threshold current.

14. The circuit of claim 13 wherein said comparator comprises:
   first and second diodes connected with one of their homologue terminals adapted to receive the threshold current, the other terminal of said first diode being coupled to said first supply terminal and the other terminal of said second diode being connected to the other end of said resistor; and
   a transducer having an input coupled to said other terminal of said second diode and an output generating said threshold signal.

15. The circuit of claim 14, further comprising an electronic switch having a control terminal adapted to receive said threshold signal from said transducer.

16. The circuit of claim 15 wherein said electronic switch comprises a transistor whose emitter-collector section is in series with said second supply terminal and whose base is said control terminal, said transistor being biased into conduction whenever said proportional current is below the threshold current.

17. The circuit of claim 16 wherein said transistor is a PNP transistor.

* * * * *